United States Patent [19]

Topper et al.

[11] Patent Number: 5,132,796
[45] Date of Patent: Jul. 21, 1992

[54] METHOD AND APPARATUS FOR DIGITALLY PROCESSING GAMMA PEDESTAL AND GAIN

[75] Inventors: Robert J. Topper, Hatboro, Pa.; Lee R. Dischert, Medford, N.J.

[73] Assignee: Matsushita Electric Industrial Co., Ltd., Osaka, Japan

[21] Appl. No.: 577,191

[22] Filed: Sep. 4, 1990

[51] Int. Cl.⁵ ............................. H04N 5/202
[52] U.S. Cl. ........................ 358/164; 358/168
[58] Field of Search ............ 358/164, 32, 166, 174, 358/168, 169, 211, 139

[56] References Cited

U.S. PATENT DOCUMENTS

| | | | |
|---|---|---|---|
| 3,963,991 | 6/1976 | Alien et al. | 358/139 |
| 4,202,009 | 5/1980 | Ushiyama et al. | 358/32 |
| 4,568,978 | 2/1986 | Cosh | 358/164 |
| 4,799,106 | 1/1989 | Moore et al. | 358/164 X |
| 4,802,002 | 1/1989 | Plut et al. | 358/211 X |
| 4,805,013 | 2/1989 | Dei et al. | 358/164 X |
| 4,866,513 | 9/1989 | Takahashi | 358/164 X |
| 4,962,433 | 10/1990 | Matsushima | 358/164 X |

FOREIGN PATENT DOCUMENTS 0145966  6/1985  European Pat. Off. ............ 358/164

Primary Examiner—Victor R. Kostak
Attorney, Agent, or Firm—Amster, Rothstein & Ebenstein

[57] ABSTRACT

A method and apparatus for gamma-correcting digital video data and for adjusting the video signal to a desired pedestal (black) level, gain (white) level, and a gamma correction value includes an apparatus for calculating digital values corresponding to a video signal having the desired gamma correction, black level and white level and a memory for storing the digital values. Uncorrected input digital video signals address the memory and cause the corresponding digital values stored in the memory, which represent the corrected video signal, to be output. The invention can be implemented in both software or hardware.

9 Claims, 4 Drawing Sheets

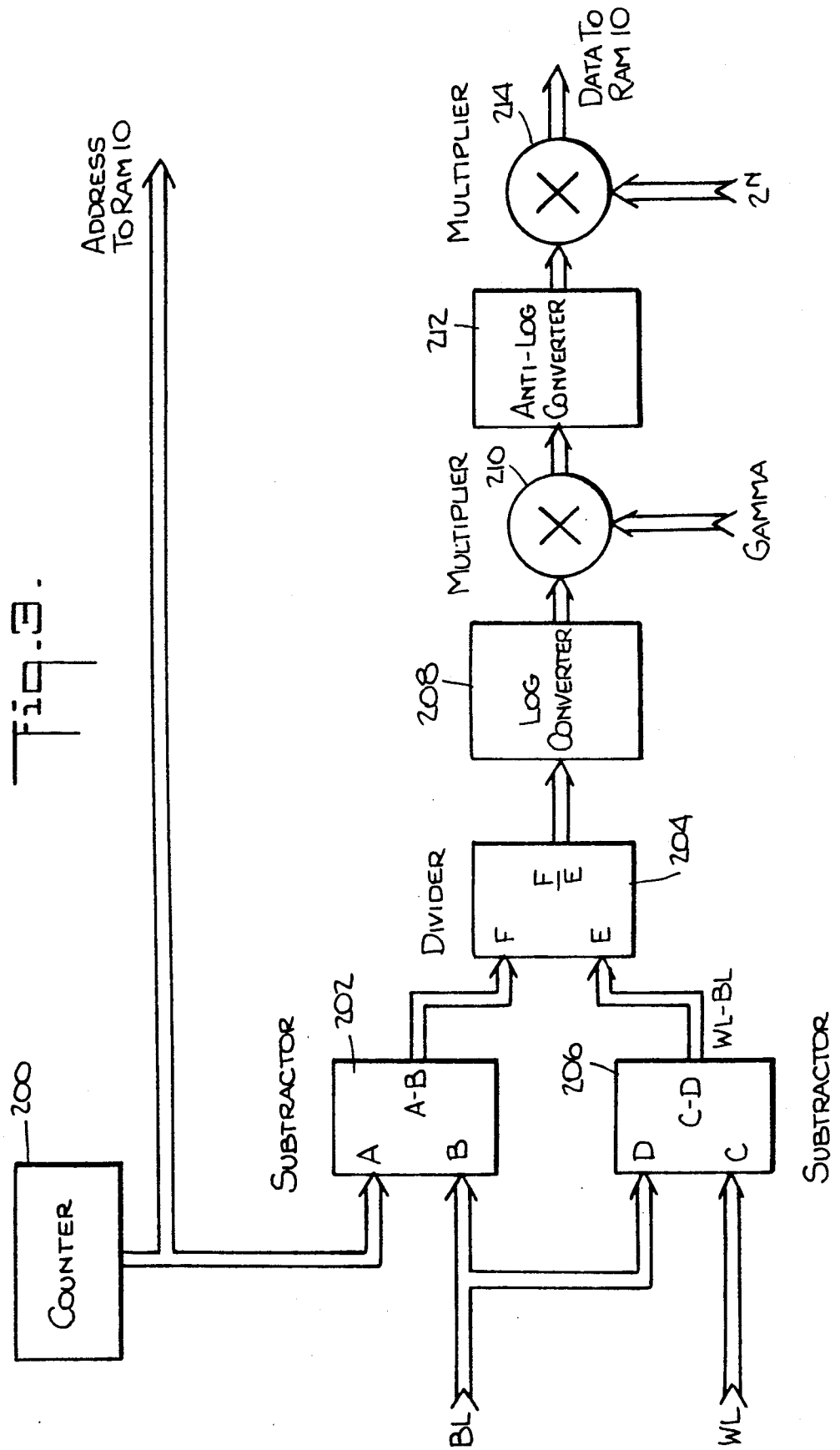

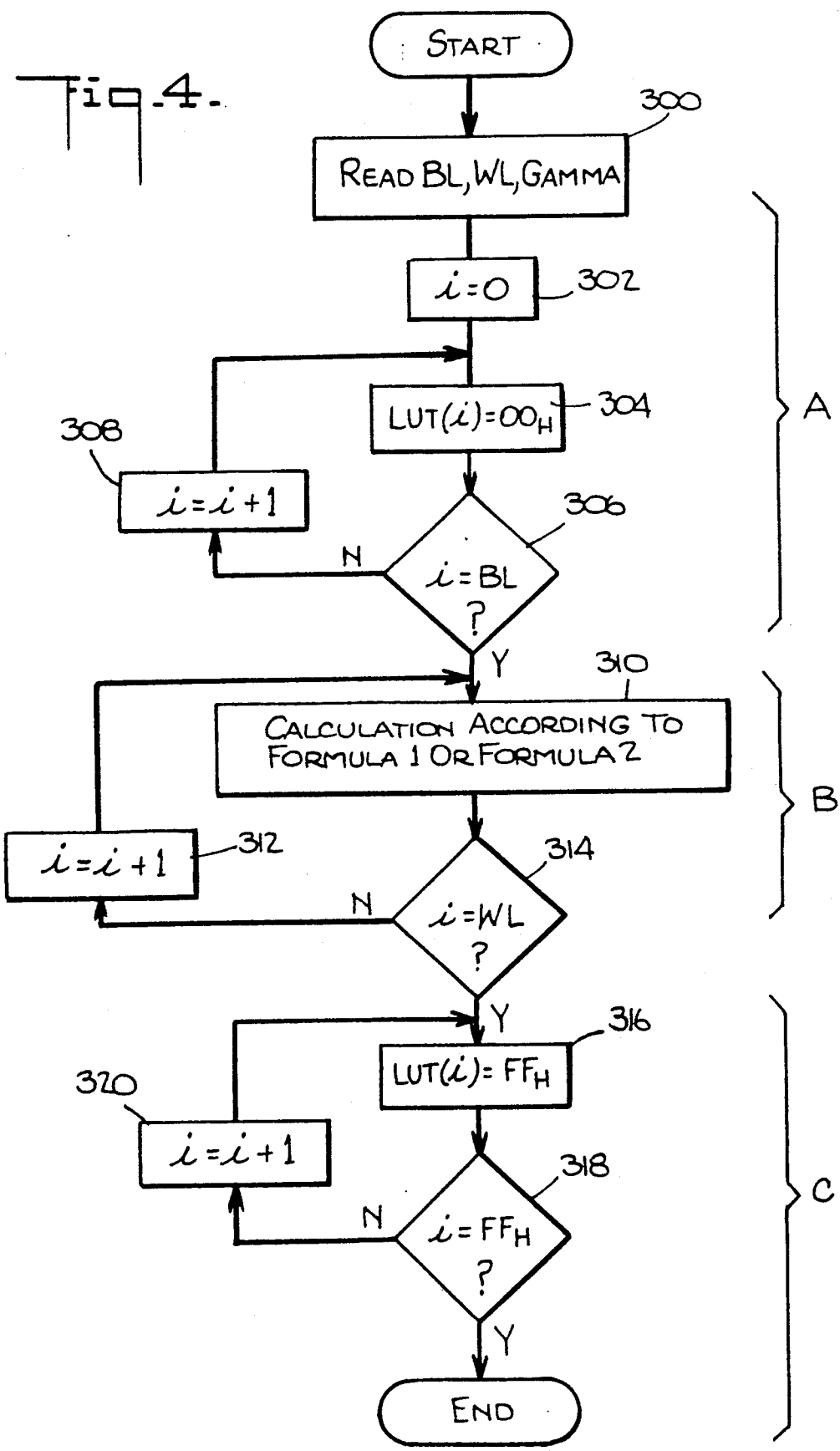

METHOD AND APPARATUS FOR DIGITALLY PROCESSING GAMMA PEDESTAL AND GAIN

BACKGROUND OF THE INVENTION

This invention relates to a method and apparatus for gamma correction and independent modification of black and white (pedestal and gain, respectively) levels.

Typically, gamma correction is accomplished by implementing a piecewise (step by-step) linear transfer function utilizing a load resistor network for a transistor. The network is interconnected with diodes to provide a plurality of gain break points at particular predetermined voltage values. A gain/voltage characteristic is generated by the gamma corrector and is selected to compensate for the non linearities of the transducer (e.g. camera or monitor). While this yields an acceptable gamma curve, it does not operate effectively when used in systems requiring the matching of several channels, for example, in a color television channel having red, green and blue channels. The result of gamma correction mismatch is a color shift for various signal amplitudes. This is most noticeable on monochrome signals which appear in color if the gain of all three channels is not the same.

Additional problems occur when it is desired to have a variable gamma value. Gamma values can be made variable using a plurality of resistors of different values, but the resolution of such systems is limited by the number of resistors available in the circuit. In addition, while circuits do exist that digitally select the resistor values to allow control of the gamma value, the gamma correction circuit is still an analog circuit and therefore includes the inherent stability problems of such analog circuits. Analog gamma correctors are made with transistor amplifiers and use resistor-diode combinations to set the various gain break points. Temperature and component age affect these components such that their characteristics do not remain constant.

Digital gamma correctors are also known in the art. It is known, for example, to input data relating to a desired transfer characteristic into a random access memory (RAM) and then, using the data stored in the RAM, to make adjustments to the video signal. See, for example, U.S. Pat. No. 4,394,688 to Iida et al. (hereinafter, "Iida") and U.S. Pat. No. 4,786,968 to Kutner (hereinafter, "Kutner"). U.S. Pat. No. 4,568,978 to Cosh teaches "real time" gamma correction without the use of RAMs. While these prior art systems eliminate the need of the above-mentioned resistor network/diode configuration for gamma correction, they do not allow independent adjustment of black and white levels. In addition, the time required to compute the data to be loaded to the RAM in the Iida Patent and the Kutner Patent slows down the correction process.

The gamma value level is not the only value that is of concern to users of television systems. The black level, or pedestal, and the white level, or gain, are also signals that affect the signal and which are routinely adjusted in the generation of a television signal.

SUMMARY OF THE INVENTION

It is an object of the invention to provide a method and apparatus enabling gamma correction of digital video data and adjustment of a desired pedestal level, gain level and gamma.

A method and apparatus for gamma-correcting digital video data and for adjusting a desired pedestal (black) level, gain (white) level, and gamma is disclosed, comprising means for calculating digital values representing desired values for gamma correction, black level and white level and storage means, such as a random access memory (RAM), loaded with said digital values, for receiving input digital video signals and outputting corresponding digital video signals modified by said digital values stored in the storage means.

While there are a number of ways in which the data to be stored in the storage means can be calculated, in the preferred embodiments of the invention, the digital values representing the desired values for gamma correction, black level and white level, are calculated according to one of the following equations:

$$RAM(i) = 0 \text{ for } i < BL;$$

$$RAM(i) = 2^{(N-1)} \text{ for } i > WL;$$

and $$RAM(i) = F2[(F1(i-BL) - F1((WL-BL))*gamma] \quad \text{for } BL \leq i \leq WL; \quad (1)$$

OR $$RAM(i) = [(i-BL)/WL-BL)]^{gamma} * 2^N \quad (2)$$

where i equals the particular address being loaded; N is the number of bits of address e.g. N=256 for an eight bit system); BL is a value representing a desired black level; WL is a value representing a desired white level; F1 is the LOG of the result of the equation following in parentheses; F2 is the ANTI-LOG of the result of the equation following in brackets; and gamma is the desired gamma value.

The present invention may be embodied in either hardware or software. A hardware embodiment of the present invention includes a digital gamma correction circuit which also allows independent modification of black and white levels (pedestal and gain). The value of gamma is continuously variable within the resolution of the number of bits used in the circuitry. A single RAM look up table (LUT) is loaded with data representing the calculated values for desired gamma, black level and white level. If the black level of an incoming video signal is too high (high gain), it can be reduced along the curve of the gamma characteristic. Likewise, if the white level of the incoming video is too low (low gain), it may be increased along the curve of the gamma characteristic while leaving the black level fixed, thus raising the video gain. The transfer characteristic can be down-loaded from a controller, for example, a microprocessor or discrete control logic. The controller calculates the values to be loaded into the RAM using, for example, either equation (1) or (2), based upon desired values for black level, white level and gamma input by a system operator. The black level adjustment, white level adjustment and gamma correction are performed independently of each other, i.e., they do not interact with each other during camera set-up.

The present invention takes advantage of the above-mentioned formulas to quickly compute the values for loading to the RAM with values at each address in the RAM corresponding to a particular desired gamma characteristic, black level and white level. The foregoing and other objectives, features and advantages of the invention will be more readily understood upon consideration of the following detailed description of certain preferred embodiments of the invention, taken in conjunction with the accompanying drawings and claims.

DESCRIPTION OF THE DRAWINGS

FIG. 3 is a block diagram of an embodiment of the calculation unit of the controller of FIG. 1, which operates to compute values to be loaded in RAM in accordance with Equation (2).

FIG. 4 is a flow chart of a software implementation of the present invention using either Equation (1) or Equation (2).

DESCRIPTION OF THE PREFERRED EMBODIMENTS

Figure 1:
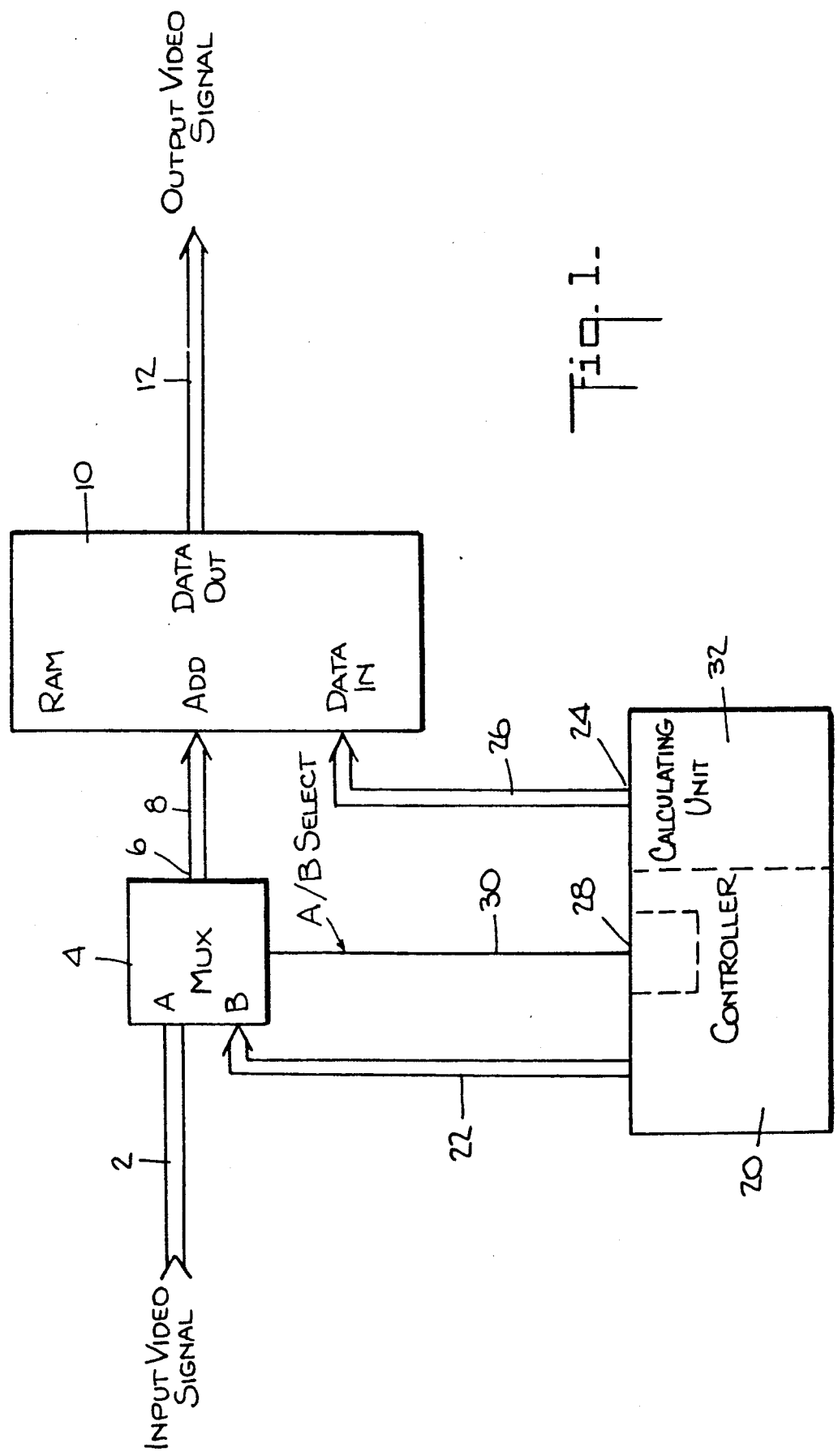
FIG. 1 is a block diagram of an apparatus for gamma correction and black and white level modification according to the present invention.

Referring to FIG. 1, an incoming digital video signal is applied via input line 2 to input A f a multiplexer 4. Output 6 of multiplexer 4 is coupled via intermediate line 8 to ADD input of RAM 10. RAM 10 has a defined number of addresses, for example, 256 for an eight bit system. Data Out of RAM 10 is the output video signal which is gamma corrected and white and black level adjusted and is coupled to the output of the system for transmission to the television monitoring equipment via output video line 12.

For purposes of the present explanation, it is assumed that RAM 10 has been loaded with the desired parameters of gamma correction and white and black levels in accordance with either Equation (1) or Equation (2) at each of its addresses. The input video signal is applied to multiplexer 4 via input line 2, and is output directly to RAM 10 via intermediate line 8. In RAM 10, the data therein acts upon the signal in a known manner to change the video signal and outputs the changed video signal to the output of the system via line 12. Since the present invention loads the addresses in RAM 10 with data relating to black level, white level and gamma, all three of those values of the input video signal are affected by the data in RAM 10. In other words, RAM 10 adjusts the values of black level, white level and gamma of the input video signals to the levels defined by the stored data.

Still referring to FIG. 1, controller 20 is coupled to input B of multiplexer 4 via controller output line 22. Controller output 24 is coupled to the Data In terminal of RAM 10 via controller output line 26. Data select control 28 of controller 20 is manipulatable, either electronically or manually, by an operator of the system as desired to change the values of gamma, white level and/or black level for the system. Data select control 28 can comprise any selection means which allows a parameter to be adjusted and which actually adjust the parameter, for example, a selector switch in conjunction with a potentiometer, or an optical tach wheel which outputs pulses to increment or decrement a counter. When data select controller 28 is manipulated by the user, multiplexer 4 is switched from input A to input B via A/B Select line 30 upon receipt of a signal from the data select controller 28, which indicates that a parameter adjustment is to be made.

If changes in any of the gamma, white level or black level is desired, the system operator manipulates data select controller 28 which cause controller 20 to output a signal on A/B Select line 30, which switches the input of multiplexer 4 from input A to input B. Controller 20 senses the desired data change indicated by the degree of manipulation of data select control 28 and causes calculating unit 32 to calculate new values for the data to be changed for the addresses of RAM 10 in accordance with Equation (1), Equation (2), or other suitable equations. Controller 20 causes the new data to be loaded into RAM 10 via input B of multiplexer 4, reflecting the desired changes in the video input signal, as described more fully below.

Once manipulation of the data select control 28 is terminated and the new data is loaded to the RAM 10, controller 20 switches multiplexer 4 from input B back to input A via a signal on A/B select line 30. RAM 10 then receives the input video signal and the new data in RAM 10 is used to process the incoming video signal so that the output video signal is corrected and adjusted for gamma, black and white levels, in accordance with the desires of the operator based on the new data in RAM 10.

Figure 2:
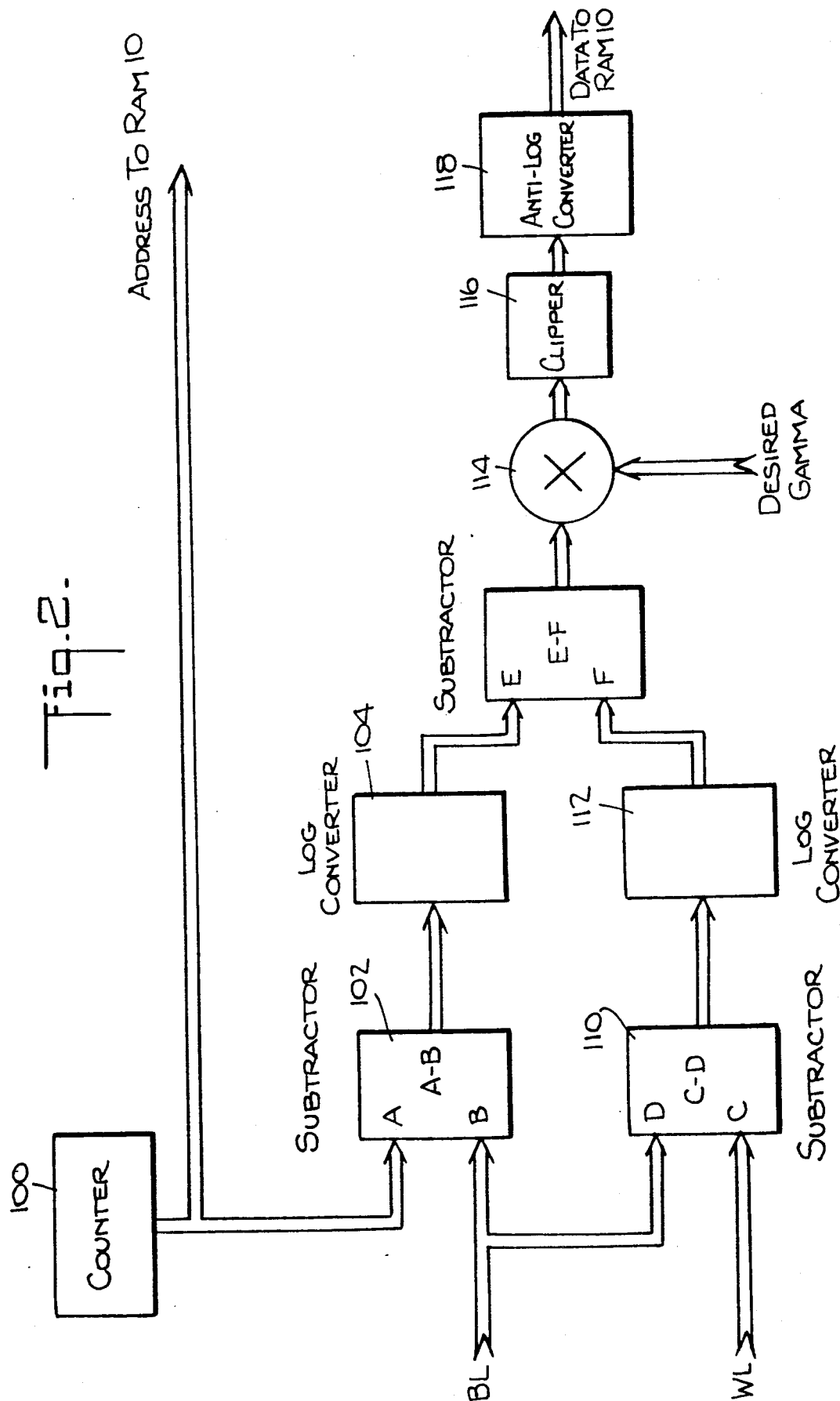
FIG. 2 is a block diagram of an embodiment of the calculation unit of the controller of FIG. 1, which operates to compute values to be loaded into RAM in accordance with Equation (1).

FIG. 2 is a block diagram of the preferred embodiment of a calculation unit 32 of controller 20 which performs the calculations set forth in Equation 1, above. Calculation unit 32 responds to manipulation by the operator data select control 28 and performs the actual calculation of the data to load into the RAM 10 to achieve the desired black level, white level, and gamma values. An address output from counter 100 is applied to RAM 10 via multiplexer 4 so that the inputs to the Data In terminal of RAM 10 are associated with the proper address. Counter 100 can comprise, for example, an eight bit address counter. A subtractor 102 also receives the output from counter 100, at input A. Input B of subtractor 102 receives a value BL indicative of the desired black level value set by the system operator via data select control 28. Subtractor 102 subtract the value input to input B from the value input to input A (A−B) and outputs that value to log converter 104, which is "burned in" with values satisfying an equation which calculates the log of the output of subtractor 102. For example, the following equation will calculate the log of X in a form readable by an eight bit digital system:

$$INT[256*log_2(X)+\tfrac{1}{2}] \tag{3}$$

where X is the output of subtractor 102 and where "INT" rounds off the result of the equation within the brackets to the nearest integer. The output of log convertor 104 is applied to input E of subtractor 106.

The value BL indicative of the desired black level is also applied to input D of subtractor 110. A value WL indicative of the desired white level set by the system operator via data select control 28 is applied to input C of subtractor 110. Subtractor 10 subtracts the value BL from the value WL (C−D) and applies the result of the subtraction to log convertor 112, which is also "burned in" with values satisfying the same equation as log convertor 104, thereby outputting the log of (BL−WL). The output of log convertor 112 is applied to input F of subtractor 106.

Subtractor 106 subtracts the value applied to input F from the value applied to input E (E−F). The result is multiplied by the desired gamma value set by the system operator via data select control 28 in multiplier 114. The signal resulting from the multiplication by multiplier 114 is applied to a clipper circuit 116. Clipper circuit 116 generates data to clip the video signal at values below the desired black level or above the desired white level. The values between the desired black and white level are unaffected by clipper circuit 116.

The output from clipper circuit 116 is applied to anti-log converter 118, which is "burned in" with values satisfying an equation which calculates the anti-log of the value input thereto in a form readable by the digital system. For example, the following equation will calculate the anti-log of X in a form readable by an eight bit digital system:

$$INT[256*2^{-X/256} + \tfrac{1}{2}] \qquad (4)$$

where X is the output of clipper circuit 116 and where "INT" rounds off the value of the result of the equation within the brackets to the nearest integer. The output of anti-log converter 118 is then applied to the Data In terminal of RAM 10.

In this manner, each address location of RAM 10 is loaded with data corresponding to the desired black level, white level and gamma. Once all the data has been loaded into RAM 10, the operation of the system is returned to its processing state, whereby the input video signals applied to RAM 10 are modified by the data stored therein for gamma correction and desired black and white levels. In the preferred embodiment, the changing of the values and loading of the new data to RAM 10 is performed during blanking intervals in a known manner so as not to interrupt the processing of the picture.

FIG. 3 is block diagram of an alternative embodiment of the calculating unit 32 of controller 20, which performs the calculations set forth in Equation 2. An address output from counter 200 is applied to RAM 10 via multiplexer 4 so that the inputs to the Data In terminal of RAM 10 are associated with the proper address. The address output from 200 is also input to input A of subtractor 202. Input B of subtractor 202 receives a value BL indicative of the desired black level value set by the system operator via data select control 28. Subtractor 202 subtracts the value BL from the address value input to input A and outputs the resultant value to input F of divider 204.

The value BL indicative of the desired black level is also applied to input D of subtractor 206. A value WL indicative of the desired white level set by the system operates via data select control 28 and is applied to input C of subtractor 206. Subtractor 206 subtracts BL from WL (C−D) and applies the result of the subtraction to input E of divider 204. Divider 204 divides the output of subtractor 202 by the output of subtractor 206 and provides the resultant value to log converter 208. Log converter 208 calculates the log of the output from divider 204 in a digitally readable form. This log value is multiplied by the desired gamma value set by the system operator via data select control 28 in multiplier 210, the result of the multiplication being applied to anti-log converter 212. Anti log converter 212 calculates the anti-log of the output of the multiplier 210 in a digitally readable form, and multiplier 214 scales the output of anti-log converter 212 by multiplying the output by $2^N$, bringing the resultant value back into a value consistent with the number of bits specified by the system hardware (for example, 0 to 255 for an eight bit system). The output of multiplexer 214 is applied for appropriate addresses of RAM 10.

The present invention can also be embodied in software. FIG. 4 is a flow-chart of a program for performing the operation of the video signal processor of the present invention. Referring to FIG. 4, in block 300, the desired values of BL, WL, and gamma level are read. In step 302, the address, i, is set to 0. Proceeding to block 304, the data in RAM 10 corresponding to the address in block 302 is set to a digital value representing black, e.g. $00_H$. At block 306, the data corresponding to the address is compared with the address of the desired black level BL. If the address i does not equal BL, the address i is incremented by 1 (block 308) and the process is carried out again. This continues until BL equals the address.

Upon reaching the point where the address equals the black level BL, the gamma characteristic is calculated at block 310 using, for example, Equation 1 or Equation 2, depending on which process or peripheral hardware is used. This calculates the exponential gamma curve. Each iteration through the gamma calculating step sets the value for an additional address location (block 312) in the RAM. When the address i equals the desired white level, WL, value as determined in block 314, the data in the remaining address locations are set at the digital value representative of peak white, for example, $FF_H$ (blocks 316, 318 and 320), thereby forming a white clipper.

The black level and white level are established with the gamma curve being formed between these two values. Using the above-described approach, the three parameters (BL, WL and gamma) are independently controlled and do not interact with each other during camera set-up.

The following example illustrates the operation of an eight-bit system according to the present invention. Eight bits were chosen for example only, and the present invention is not limited to an eight-bit system. For an eight-bit system there are 256 input addresses to the RAM 10. Assuming that the address of the desired black level is 36 and the address of the desired white level is 226, loop A of FIG. 4 will repeat 37 times, loop B will repeat 189 times, and loop C will repeat 30 times, for a total of 256 iterations.

Using the above values of 36 for the address of the desired black level and 226 for the address of the desired white level, and further assuming a desired gamma of 0.45, the following table illustrates the arithmetic results performed by the controller illustrated in FIG. 2 of the present invention:

| ADDRESS | 0 | 36 | 37 | 255 |
|---|---|---|---|---|
| OUTPUT OF SUBTRACTOR 102 | −36 | 0 | 1 | 219 |
| OUTPUT OF SUBTRACTOR 110 | 190 | 190 | 190 | 190 |
| OUTPUT OF LOG CONVERTER 104 | −32768 | −32768 | 0 | 1990 |
| OUTPUT OF LOG CONVERTER 112 | 1938 | 1938 | 1938 | 1938 |
| OUTPUT OF SUBTRACTOR 106 | 34706 | 34706 | 1938 | −52 |
| OUTPUT OF MULTIPLIER 114 | 15646 | 15646 | 872 | −23 |
| OUTPUT OF CLIPPER 116 | 4095 | 4095 | 872 | 0 |
| OUTPUT OF ANTI-LOG CONVERTER 118 | 0 | 0 | 25 | 255 |

As is evident from the above example, changing the black level, gamma level, and/or white level will change the value in each address location of RAM 10. Thus, changing any one or all of these values will change the output video signal. For the above example illustrating an eight bit system, note that clipper 116 will output a zero if the input thereto is less than zero, output 4095 if the input thereto is greater than or equal to 4095, and output the input value without modification if the input value is greater than or equal to zero but less than 4095.

Although the present invention has been shown and described with respect to preferred embodiments, various changes and modifications will be apparent to a person skilled in the art to which the invention pertains and are deemed to come within the spirit and scope of the invention which is set forth in the appended claims.

What is claimed is:

1. A method of processing video signals, comprising:
reading video signals;
providing in a memory data for correcting gamma, black level and white level of said video signals by the steps of:
reading desired black level, white level and gamma;
setting the data in said memory such that memory locations below the desired black level equal a preselected quantity;
setting the data in said memory such that memory locations above the desired white level equal a preselected quantity;
computing for each of the memory locations between said desired black level and white level data representative of gamma correction; and
applying video signals to said memory to produce video signals corrected for gamma, black level and white level.

2. An apparatus for gamma correcting digital video data and for adjusting a desired black level, white level and gamma comprising:
storage means responsive to said video data having a plurality of memory locations responsive to digital video signals for storing data at address locations indicative of gamma correction, black level and white level for said digital video signals;
control means coupled to said memory for changing said stored data in response to desired changes in gamma, black level and white level;
said storage means providing at its output video signals which are corrected and adjusted in accordance with the data stored in the memory locations thereof.

3. The apparatus of claim 2, wherein said control means provides preselected data to memory locations in said storage means below the desired black level and above the desired white level and computes data for the memory locations for correcting said video signals in accordance with the computed data.

4. An apparatus for correcting input video signals comprising:
selection means for enabling an operator to select values of gamma, a black level and a white level;
control means responsive to operator selected values of gamma, black level and white level for controlling the correction of said input video signals, including calculating means for calculating correction values for said input video signals based upon said operator selected values of gamma, black level and white level; and
memory means coupled to said control means for receiving said correction values and said input video signals and for outputting said input video signals modified in accordance with said correcting values.

5. An apparatus for correcting input video signals comprising:
control means responsive to desired values of gamma, black level BL and white level WL for controlling the correction of said input video signals including calculating means for calculating correction values RAM(i) for said input video signals based upon said desired values of gamma, black level BL and white level WL, wherein said calculating means calculates said correction values RAM(i) according to the following formula:

$$RAM(i) = 0 \text{ for } i < BL;$$

$$RAM(i) = (N-1) \text{ for } i > WL;$$

and $$RAM(i) = F2[(F1(i-BL) - F1(WL-BL))*gamma]$$
$$\text{for } BL \leq i \leq WL$$

where i is a particular address value, F1 is the LOG of the value following in parentheses and F2 is the ANTI-LOG of the value following in brackets; and
memory means coupled to said control means for storing said correction values and responsive to said input video signals for correcting said input video signals based upon said stored correction values.

6. An apparatus for correcting input video signals comprising:
control means responsive to desired values of gamma, black level BL and white level WL for controlling the correction of said input video signals including calculating means for calculating correction values RAM(i) for said input video signals based upon said desired values of gamma, black level BL and white level WL, wherein said calculating means calculates said correction values RAM(i) according to the following formula:

$$RAM(i) = [(i-BL)/(WL-BL)]^{gamma} * 2^N$$

where i is a storage address and N is the number of bits representing said video signals; and
memory means coupled to said control means for storing said correction values and responsive to said input video signals for correcting said input video signals based upon said stored correction values.

7. An apparatus for correcting input video signals comprising control means for controlling the correction of said input video signals, including calculating means for calculating correction values for said input video signals based upon desired values of gamma, black level BL and white level WL, wherein said calculating means includes:
first subtracting means for producing a first output signal formed by subtracting said desired black level BL from an address in said memory means;
second subtracting means for producing a second output signal formed by subtracting said desired black level BL from said desired white level WL;
log converting means for converting the outputs of said first subtracting means and said second subtracting means into first and second log values, respectively;

third subtracting means for producing a third output signal formed by subtracting said first log value from said second log value;

multiplication means for producing a fourth output signal formed by multiplying the output of said third subtracting means by said desired gamma value;

clipping means for outputting a first signal indicative of black when said address in said memory means is less than or equal to said desired black level BL, for outputting a signal indicative of white when said address in said memory means is greater than said desired white level WL, and for passing the output of said multiplication means without modification when said address in said memory means is greater than said desired black level BL and less than said white level WL;

anti-log converting means for converting the output of said clipping means to an exponential value; and memory means coupled to said control means for receiving and storing the output of said anti-log converting means to form said correction values and responsive to said input video signals for correcting said input video signals based upon said stored correction values.

8. A method for correcting an input video signal in response to operator entered values of gamma, black level and white level comprising the steps of:

calculating correction values for said input video signal based upon said operator entered values of gamma, black level and white level;

storing said correction values in a memory; and applying said input video signal to said memory to output therefrom a corrected video signal dependent upon said correction values stored in said memory.

9. A method for correcting the value of an input video signal in accordance with desired values of gamma, black level BL and white level WL comprising the steps of:

selecting a black level value BL and subtracting said black level value BL from said value of said video signal to form a first subtracted value;

forming a first logarithm of said first subtracted value;

selecting a white level value WL and subtracting said black level value BL from said white level value WL to form a second subtracted value;

forming a second logarithm of said second subtracted value;

subtracting said first logarithmic value from said second logarithmic value to form a third subtracted value;

multiplying said third subtracted value by said desired gamma value;

clipping said multiplied value so that multiplied values representative of levels below said black level value BL are converted to a first predetermined number, multiplied values exceeding the white level value WL are converted to a second predetermined number, and multiplied values representative of values between said black level and said white level are passed without modification;

forming the anti-logarithm of said clipped values;

storing said anti-logarithm in a memory; and applying said input video signal to said memory to output therefrom a corrected video signal corresponding to said stored anti-logarithm.

* * * * *